(12) United States Patent
Takezawa et al.

(10) Patent No.: US 6,702,443 B2
(45) Date of Patent: Mar. 9, 2004

(54) PROJECTOR

(75) Inventors: Takeshi Takezawa, Matsumoto (JP); Toshiaki Hashizume, Okata (JP); Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 10/334,012

(22) Filed: Dec. 31, 2002

(65) Prior Publication Data

US 2003/0133077 A1 Jul. 17, 2003

Related U.S. Application Data

(63) Continuation of application No. 09/813,862, filed on Mar. 22, 2001, now Pat. No. 6,536,901.

(30) Foreign Application Priority Data

Mar. 24, 2000 (JP) ........................................ 2000-084955

(51) Int. Cl.$^7$ .............................................. G03B 21/14
(52) U.S. Cl. ...................................................... 353/20
(58) Field of Search .............................. 353/20, 30, 31

(56) References Cited

U.S. PATENT DOCUMENTS

| | | | |
|---|---|---|---|
| 6,190,933 B1 * | 2/2001 | Shimabukuro et al. | 438/30 |
| 6,220,713 B1 * | 4/2001 | Tadic-Galeb et al. | 353/77 |
| 6,359,721 B1 * | 3/2002 | Fujimori | 359/246 |
| 6,536,901 B2 * | 3/2003 | Takezawa et al. | 353/20 |

FOREIGN PATENT DOCUMENTS

| | | | | |
|---|---|---|---|---|
| EP | 1 016 894 A2 | 7/2000 | | |
| EP | 1016894 A2 * | 7/2000 | ......... | G02F/1/1333 |
| EP | 1079263 A1 | 7/2000 | | |
| EP | 1079263 A1 * | 2/2001 | ......... | G02F/1/1335 |
| JP | A 10-325954 | 12/1998 | | |
| JP | A 11-231277 | 8/1999 | | |
| JP | 11337919 A * | 12/1999 | ......... | G02F/1/1333 |
| JP | 2000193927 A * | 7/2000 | ............. | G02F/1/13 |
| JP | 2000206507 A * | 7/2000 | ......... | G02F/1/1333 |

* cited by examiner

Primary Examiner—Russell Adams
Assistant Examiner—Michelle P Nguyen
(74) Attorney, Agent, or Firm—Oliff & Berridge, PLC

(57) ABSTRACT

A technique capable of easily manufacturing a projector without deteriorating too much the optical characteristics of the projector. A projector includes an illuminating optical system for emitting illumination light, an electro-optical device for modulating light from the illuminating optical system according to image information, and a projection optical system for projecting a modulated light beam flux obtained by the electro-optical device. The electro-optical device includes a single-crystal sapphire substrate having nearly a rectangular shape, and a polarizer provided on the single-crystal sapphire substrate on at least one side of a light incidence surface and a light emission surface. The single-crystal sapphire substrate includes a c-axis substantially parallel to the surface of the substrate, and the c-axis has an inclination of about 3° to about 7° with respect to a reference side selected from perpendicularly intersecting two sides of the nearly rectangular shape.

10 Claims, 10 Drawing Sheets

PROJECTOR

BACKGROUND OF THE INVENTION

1. Field of Invention

The present invention relates to a projector for projecting and displaying an image.

2. Description of Related Art

In projectors, light emitted from an illuminating optical system is modulated according to image information (image signals) with the use of a liquid crystal light valve or the like, and the modulated light is projected onto a screen, thereby achieving image display.

The liquid crystal light valve commonly includes a liquid crystal panel and a polarizer formed on the side of a light incidence surface or on the side of a light emission surface. The polarizer transmits only a light component in a direction of a polarization axis and intercepts other light components. This will modulate the light incident on the liquid crystal light valve according to image information.

The polarizer commonly generates heat when it intercepts light other than a light component in the direction of the polarization axis. When the temperature of the polarizer is raised by the generation of heat, the polarizer is strained or deteriorated, and the polarizer transmits light that should not be transmitted or intercepts light that should not be intercepted. In order to reduce the temperature rise, the polarizer has been provided on a single-crystal sapphire substrate having high heat conductivity.

FIG. 10 is an illustration showing a conventionally used single-crystal sapphire substrate 908. A polarizer 902 is bonded on a single-crystal sapphire substrate 908 as shown by broken lines in the figure. The single-crystal sapphire substrate 908 and the polarizer 902 are formed according to an effective display area of a liquid crystal panel having nearly a rectangular shape, so that the single-crystal sapphire substrate 908 and the polarizer 902 have nearly a rectangular shape.

The single-crystal sapphire substrate 908 includes a c-axis substantially parallel to the surface of the substrate. In addition, the c-axis is substantially parallel to a first side s1 selected from perpendicularly intersecting two sides s1 and s2 of the nearly rectangular shape. Specifically, the single-crystal sapphire substrate 908 is accurately formed so that an inclination angle θ of the c-axis with respect to the reference side s1 of the substrate falls within about 1°.

Such a single-crystal sapphire substrate having high c-axis accuracy is used in the conventional projector in order not to change too much the polarization state of light passing through the single-crystal sapphire substrate. The use of such a single sapphire substrate can provide excellent maintenance of optical characteristics of the projector.

However, much labor is required to manufacture such a single-crystal sapphire substrate 908 having high c-axis accuracy and, consequently, much labor is required to manufacture a projector using the single-crystal sapphire substrate 908 having high c-axis accuracy. This is because, in order to obtain a single-crystal sapphire substrate having high c-axis accuracy, an adjusting procedure should be repeatedly performed such that the inclination angle θ of the c-axis is measured by X-ray diffraction or the like after producing a single-crystal sapphire substrate having relatively low c-axis accuracy and further, the sapphire glass substrate is polished.

This invention is made to solve the above-described problems in the conventional art. One object of the various embodiments of the invention is to provide a technique capable of easily manufacturing a projector without deteriorating too much the optical characteristics of the projector.

SUMMARY OF THE INVENTION

In order to solve at least a part of the above-described problems, according to a first embodiment of the present invention, there is provided a projector including:

an illuminating optical system that emits illumination light;

an electro-optical device that modulates light from the illuminating optical system according to image information; and a projection optical system that projects a modulated light beam flux obtained by the electro-optical device;

wherein the electro-optical device includes a single-crystal sapphire substrate having a substantially rectangular shape disposed on at least one side of a light incidence surface and a light emission surface; and a polarizer provided on the single-crystal sapphire substrate;

the single-crystal sapphire substrate includes a c-axis substantially parallel to the surface of the substrate; and the c-axis has an inclination of about 3° to about 7° with respect to one reference side selected from perpendicularly intersecting two sides of the nearly rectangular shape.

In the projector of the present invention, the polarizer is provided on the single-crystal sapphire substrate having the c-axis inclined about 3° to about 7° with respect to the reference side of the nearly rectangular shape. The use of such a single-crystal sapphire substrate makes it possible to easily manufacture the projector without deteriorating too much the optical characteristics of the projector.

In the above device, the polarizer may be provided on the single-crystal sapphire substrate so that the polarization axis thereof is substantially parallel to or perpendicular to the reference side.

If the polarizer is provided on the single-crystal sapphire substrate in this way, the relationship between the c-axis of the substrate and the polarization axis of the polarizer can be set to be substantially parallel to or perpendicular to each other. This makes it possible to reduce the change in the polarization state of light due to the passage through the single-crystal sapphire substrate.

In the above device, the polarizer formed on the single-crystal sapphire substrate may be provided on the side of the light emission surface of the electro-optical device, and the single-crystal sapphire substrate and the polarizer may be disposed so that light emitted from the polarizer enters the single-crystal sapphire substrate.

In addition, in the above device, the polarizer formed on the single-crystal sapphire substrate may be provided on the side of the light incidence surface of the electro-optical device, and the single-crystal sapphire substrate and the polarizer may be disposed so that light emitted from the single-crystal sapphire substrate enters the polarizer.

If the single-crystal sapphire substrate and the polarizer are disposed in this order, the polarization state of light is changed by passing through the single-crystal sapphire substrate, but lowering of contrast of an image light (modulated light) is avoided.

According to a second embodiment of the present invention, there is provided a projector that projects and displays a color image, including:

an illuminating optical system that emits illumination light;

a color light separation optical system that separates the illumination light emitted from the illuminating optical system into first to third color lights having three color components;

first to third electro-optical devices that modulate the first to third color lights separated by the color light separation optical system according to image information to produce first to third modulated light beam fluxes;

a color synthesizing section that synthesizes the first to third modulated light beam fluxes; and a projection optical system that projects synthesized light emitted from the color synthesizing section;

wherein each of the first to third electro-optical devices includes a single-crystal sapphire substrate having a substantially rectangular shape disposed on at least one side of a light incidence surface and a light emission surface; and a polarizer provided on the single-crystal sapphire substrate;

the single-crystal sapphire substrate includes a c-axis substantially parallel to the surface of the substrate; and the c-axis has an inclination of about 3° to about 7° with respect to one reference side selected from perpendicularly intersecting two sides of the nearly rectangular shape.

In this projector, the polarizer is also provided on the single-crystal sapphire substrate having the c-axis inclined about 3° to about 7° with respect to the reference side of the nearly rectangular shape, so that it is possible to easily manufacture the projector without deteriorating too much the optical characteristics of the projector.

DETAILED DESCRIPTION OF PREFERRED EMBODIMENTS

Figure 1:
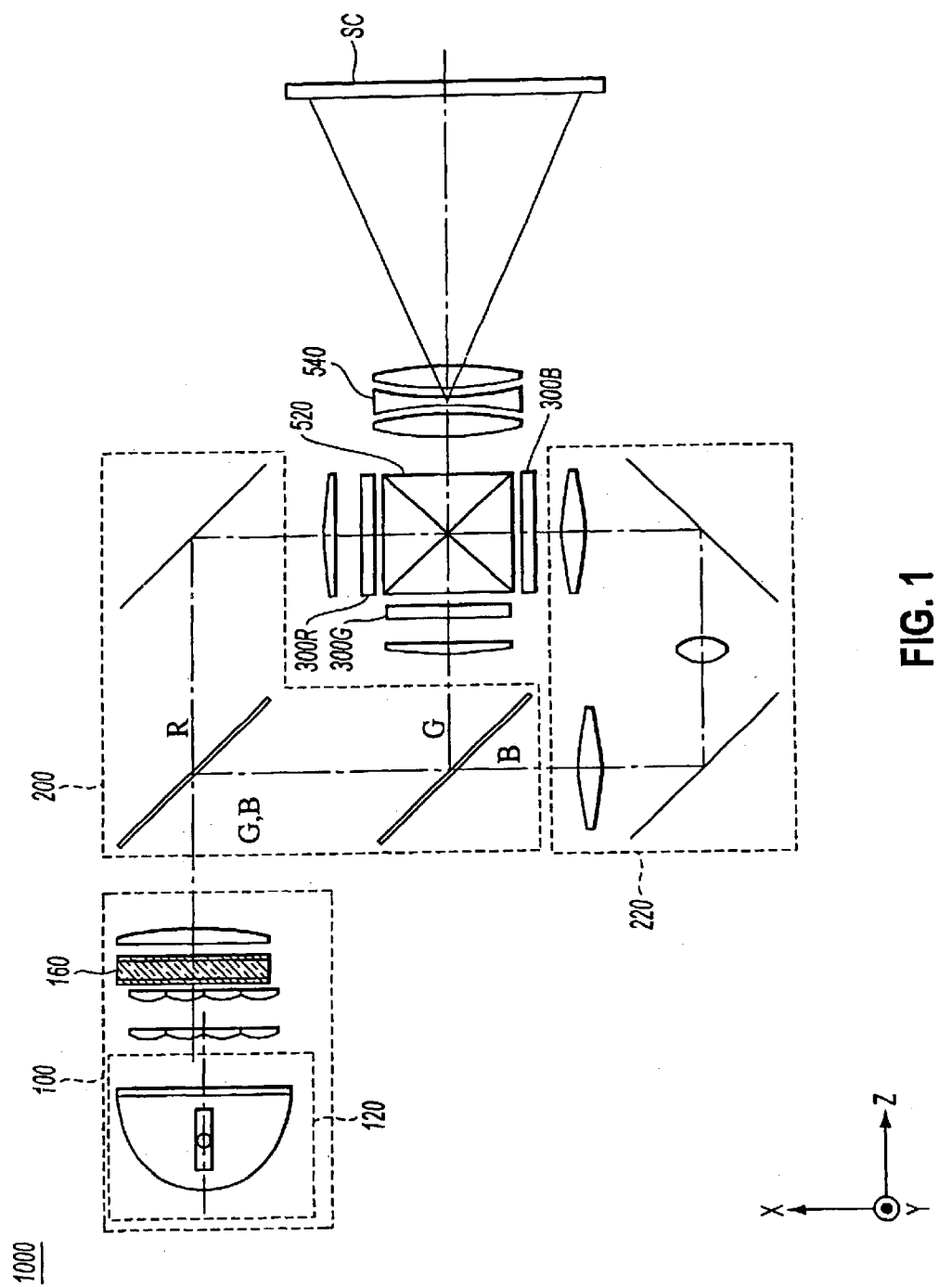
FIG. 1 illustrates a first embodiment of a projector to which the present invention is applied.

A mode for carrying out the present invention will now be described based on an embodiment. FIG. 1 illustrates a first embodiment of a projector to which the present invention is applied. A projector 1000 includes an illuminating optical system 100, a color light separation optical system 200, a relay optical system 220, three liquid crystal light valves 300R, 300G, and 300B, a crossed dichroic prism 520, and a projection optical system 540.

The illuminating optical system 100 includes a polarized-light generating optical system 160 that converts light emitted from a light source device 120 into one type of linear polarized light beam polarized in the same direction, and emits the light. Light emitted from the illuminating optical system 100 is separated by the color light separation optical system 200 into light of the three colors red (R), green (G), and blue (B). Each separated color light is modulated by the liquid crystal light valves 300R, 300G, and 300B according to image information (image signals). Modulated light beam fluxes of the three colors modulated by the liquid crystal light valves 300R, 300G, and 300B are synthesized by the crossed dichroic prism 520 to be projected onto a screen SC by the projection optical system 540. This allows a color image to be displayed on the screen SC. Since configurations and functions of components in the projector shown in FIG. 1 are described in detail in, for example, Japanese Unexamined Patent Publication Application No.10-325954 to the present applicant, a detailed description of the projector will be omitted in this specification.

Figure 2:
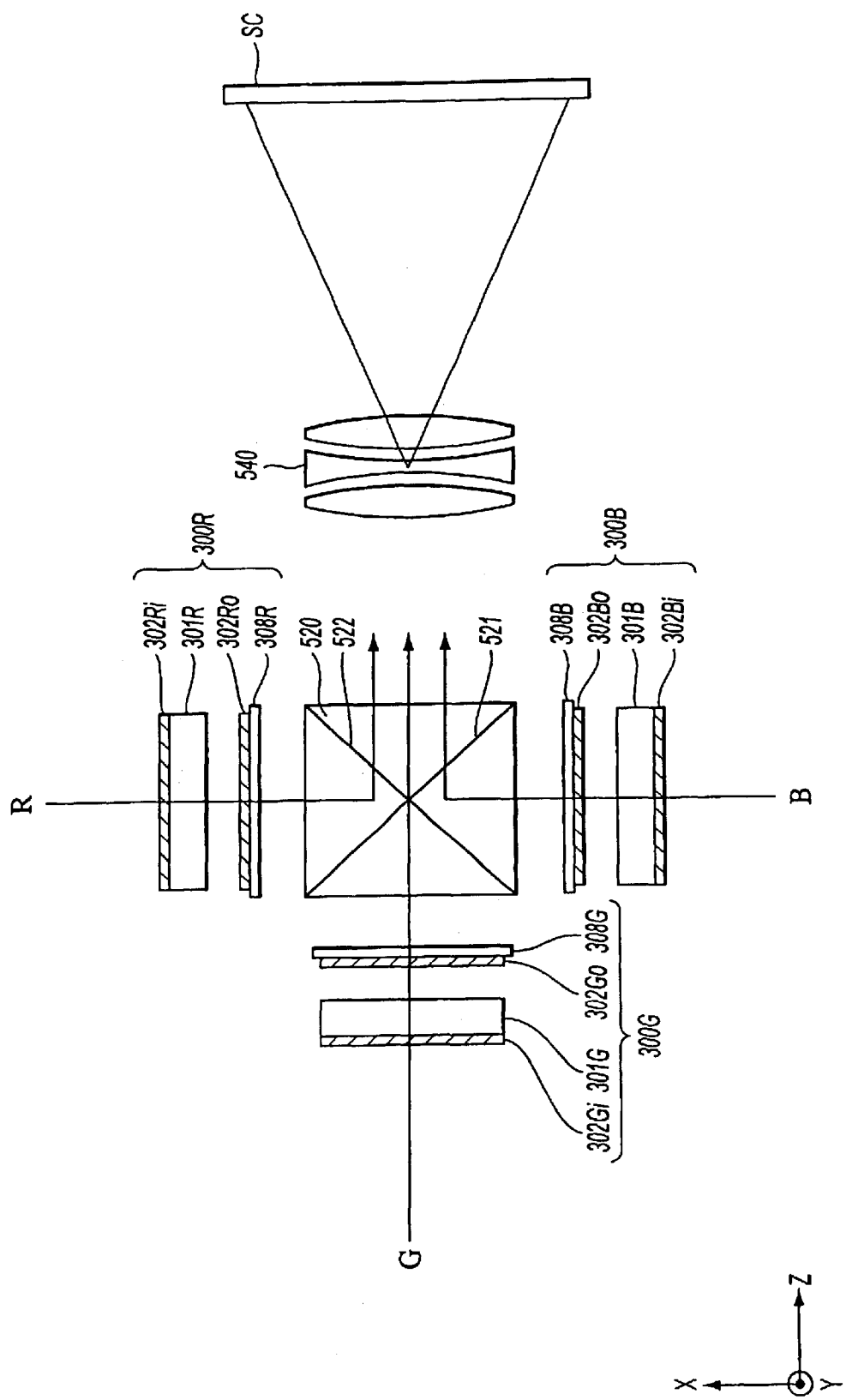
FIG. 2 illustrates a principal part of a projector 1000 in FIG. 1.

FIG. 2 illustrates a principal part of the projector 1000 in FIG. 1. FIG. 2 shows the three liquid crystal light valves 300R, 300G, and 300B, and the crossed dichroic prism 520 in FIG. 1.

The color lights R, G, and B enter the first to third liquid crystal light valves 300R, 300G, and 300B, respectively. The modulated light beam flux of the color light R emitted from the first liquid crystal light valve 300R is reflected by a red light-reflecting film 521 of the crossed dichroic prism 520, and the modulated light beam flux of the color light B emitted from the third liquid crystal light valve 300B is reflected by a blue light-reflecting film 522. On the other hand, the modulated light beam flux of the color light G emitted from the second liquid crystal light valve 300G is transmitted by the two reflecting films 521 and 522 of the crossed dichroic prism 520. In this way, three modulated light beam fluxes are synthesized, and a color image is displayed on the screen SC by the projection optical system 540. In FIG. 2, positions where the red light and the blue light are reflected are shown at positions shifted from the two reflecting films 521 and 522 for convenience of illustration.

The first liquid crystal light valve 300R includes a liquid crystal panel 301R and two polarizers 302Ri and 302Ro provided on the side of a light incidence surface and on the side of a light emission surface thereof. The first polarizer 302Ri provided on the side of the light incidence surface is bonded to the liquid crystal panel 301R. On the other hand, the second polarizer 302Ro provided on the side of the light emission surface is bonded on a single-crystal sapphire substrate 308 at a position apart from the liquid crystal panel 301R. Antireflection films (not shown) for preventing reflection of light on interfaces are formed on the light incidence surface of the first polarizer 302Ri, the light incidence surface of the second polarizer 302Ro, and the light emission surface of the single-crystal sapphire substrate 308R to which the second polarizer 302Ro is bonded.

The color light R incident on the first liquid crystal light valve 300R is a linear polarized light beam since it is emitted from the illuminating optical system 100 (FIG. 1) including the polarized-light generating optical system 160. The polarization axis of the first polarizer 302Ri provided on the side of the light incidence surface of the liquid crystal light valve 300R is set so as to coincide with the polarization direction of the incident linear polarized light beam. Therefore, almost all of the color light R incident on the first polarizer 302Ri passes unchanged through the first polarizer 302Ri. The polarized light beam emitted from the first polarizer 302Ri is modulated by the liquid crystal panel 301R. The second polarizer 302Ro emits only a light component polarized in the same direction as the polarization axis in the light modulated by the liquid crystal panel 301R. The modulated light beam flux emitted from the second polarizer 302Ro passes through the single-crystal sapphire substrate 308 to enter the crossed dichroic prism 520.

As described above, while the first polarizer 302Ri transmits almost all of the incident linear polarized light beams, the second polarizer 302Ro intercepts a part of the incident modulated light.

For this reason, the second polarizer 302Ro produces a larger amount of heat than the first polarizer 302Ri does. In this embodiment, in order to reduce the temperature rise of the second polarizer 302Ro that produces a relatively large amount of heat, only the second polarizer 302Ro is provided on the single-crystal sapphire substrate 308R.

This also applies to the second and third liquid crystal light valves 300G and 300B. Second liquid crystal light valve 300G includes a liquid crystal panel 301G and two polarizers 302Gi and 302Go provided on the side of a light incidence surface and on a side of a light emission surface thereof. Only the second polarizer 302Go is provided on the signal-crystal sapphire substrate 308G. Third liquid crystal light valve 300B includes a liquid crystal panel 301B and two polarizers 302Bi and 302Bo provided on the side of a light incidence surface and on a side of a light emission surface thereof. Only the second polarizer 302Bo is provided on the single-crystal sapphire substrate 308B.

Figure 3:
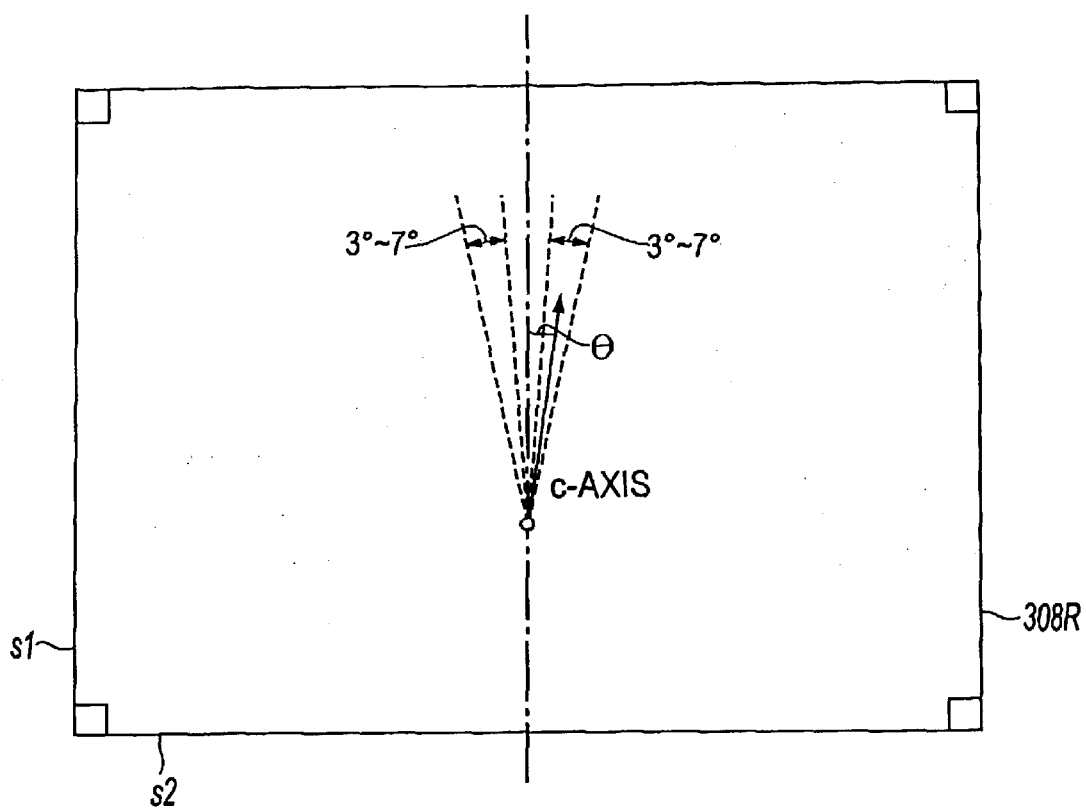
FIG. 3 illustrates a single-crystal sapphire substrate 308.

FIG. 3 illustrates the single-crystal sapphire substrate 308R in FIG. 2. Although only the single-crystal sapphire substrate 308R is discussed here, it should be appreciated that the structure of the single-crystal sapphire substrate 308R is identical to the structure of the single-crystal sapphire substrates 308G and 308B. The single-crystal sapphire substrate 308R has a substantially rectangular shape including perpendicularly intersecting two sides s1 and s2. The single-crystal sapphire substrate 308R in this embodiment has a thickness of about 700 $\mu$m.

The c-axis of the single-crystal sapphire substrate 308R is set to be substantially parallel to the surface of the substrate, in other words, included in a plane of the substrate. The c-axis of the single-crystal sapphire substrate 308R is set to be substantially parallel to the surface of the single-crystal sapphire substrate 308R because the temperature distribution of the polarizer bonded on the substrate becomes more uniform as compared with a case where the c-axis of the single-crystal sapphire substrate is set to be substantially perpendicular to the surface of the single-crystal sapphire substrate 308R.

In addition, while the c-axis of the single-sapphire substrate 308R is substantially parallel to the reference side s1 selected from the perpendicularly intersecting two sides s1 and s2 of the substantially rectangular shape, the c-axis is inclined by an angle of $\theta$ with respect to the reference side s1. The inclination angle $\theta$ of the c-axis with respect to the reference side s1 is set to be in the range of about 3° to about 7°.

Figure 4:
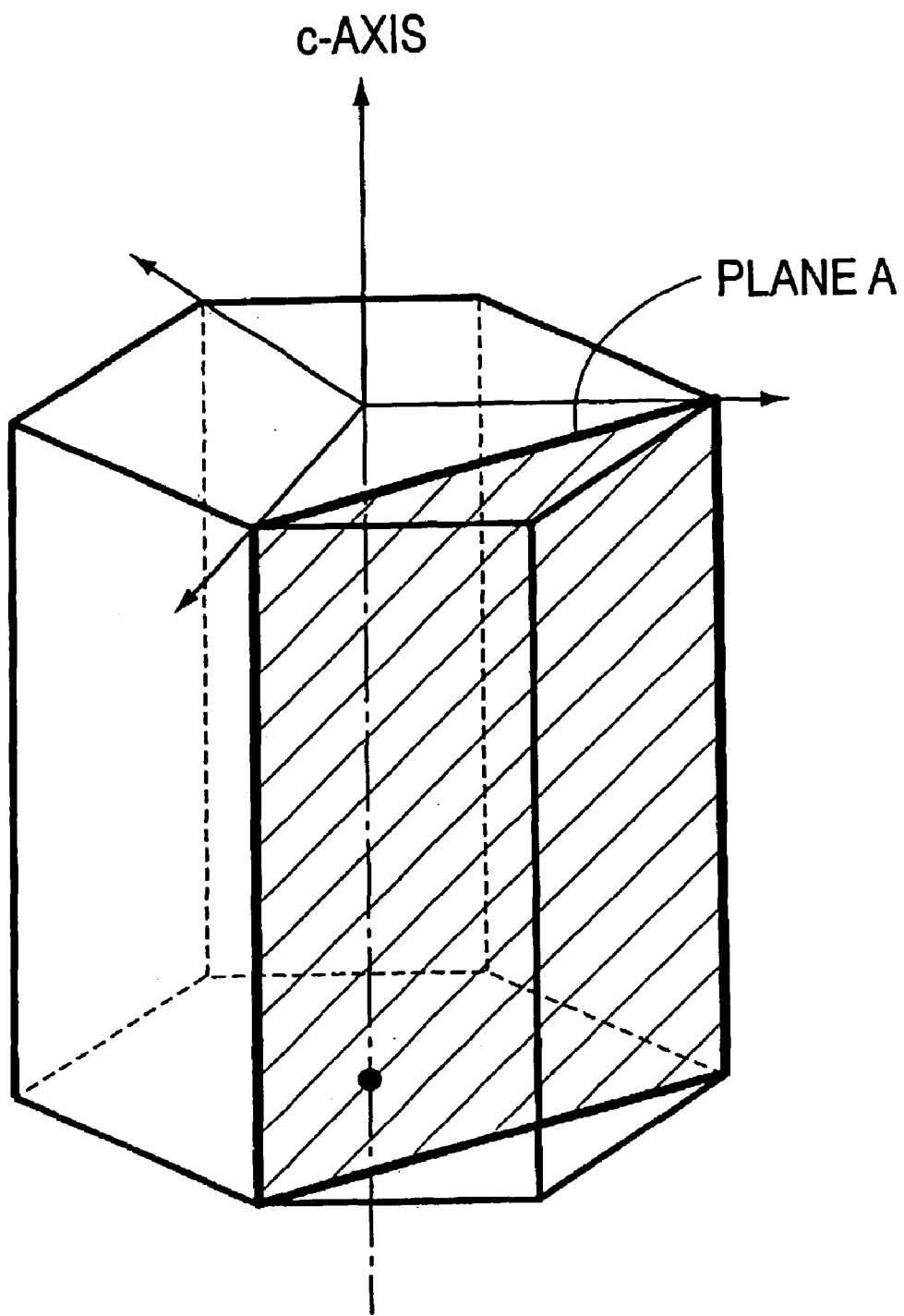
FIG. 4 illustrates the crystalline structure of the single-crystal sapphire.

FIG. 4 illustrates the crystal structure of the single-crystal sapphire substrate 308R. Although the single-crystal sapphire is the rhombohedral system to be accurate, it may be considered as the hexagonal system as shown in FIG. 4. As shown in FIG. 4, the c-axis is parallel to the plane A. The single-crystal sapphire substrate 308R in FIG. 3 is molded so that the plane A is the surface of the substrate.

Figure 5:
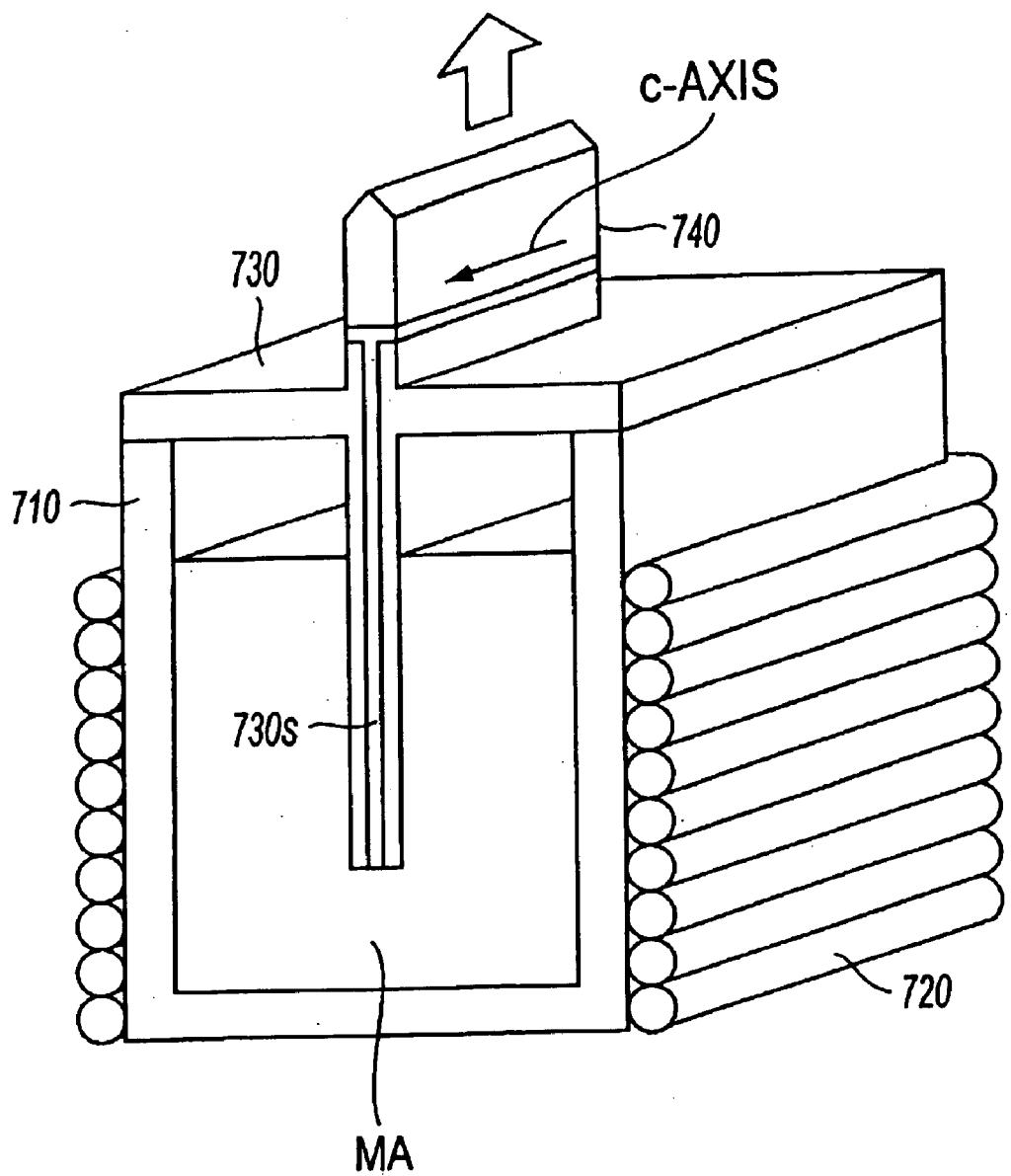
FIG. 5 illustrates a crystal-growing device using an EFG method.

The single-crystal sapphire substrate 308R used in this embodiment can be formed by, for example, a known EFG method (Edge-defined Film-fed Growth Method). FIG. 5 illustrates a crystal-growing device using the EFG method. The device includes a crucible 710 for storing alumina melt MA, a heating coil 720 arranged so as to surround the crucible, and a crystal-growing die 730 including a slit 730s for determining the external shape of a grown crystal.

The crucible 710 is heated by the heating coil 720. The alumina melt MA in the heated crucible 710 fills the slit 730s due to a capillary phenomenon, and is led to the upper end of the die 730. If a seed crystal of a single-crystal sapphire is placed in the alumina melt led to the upper end of the mold 730 and the seed crystal is slowly pulled up, a plate-like single-crystal sapphire plate 740 can be obtained. The single-crystal sapphire substrate 308R in this embodiment is, as shown in FIG. 5, obtained by cutting the single-crystal sapphire plate 740 grown in the form of plate to a predetermined size.

When growing the single-crystal sapphire plate with the use of this device, it is possible to produce a single-sapphire plate such that the surface of the plate is substantially parallel to the c-axis by suitably adjusting the positional relationship between the seed crystal and the die 730. It is also possible to make one side of the single-crystal sapphire plate substantially parallel to the c-axis by suitably adjusting the positional relationship between the seed crystal and the die 730. Actually, however, it is very difficult to produce a single-crystal sapphire plate in which the inclination angle $\theta$ of the c-axis with respect to one side of the plate is about 1° or less, and many single-crystal sapphire plates having relatively low c-axis accuracy are produced in which the inclination angle $\theta$ is about 3° to about 7°.

As previously described, single-crystal sapphire plates having high c-axis accuracy have been produced in which the inclination angle $\theta$ is about 1° or less by repeatedly performing an adjusting procedure such that the inclination angle $\theta$ of the c-axis of the thus-produced single-crystal sapphire substrate having relatively low c-axis accuracy is measured by X-ray diffraction or the like, and the single-crystal sapphire substrate is polished.

The single-crystal sapphire substrate 308R of this embodiment, however, does not require the above adjusting procedure. The c-axis of the single-crystal sapphire substrates 308R is inclined about 3° to about 7° with respect to the reference side s1, as shown in FIG. 3. This makes it possible to easily manufacture the single-crystal sapphire substrate 308R for bonding thereto the polarizer, and consequently, it is possible to easily manufacture the projector.

Figure 6A:
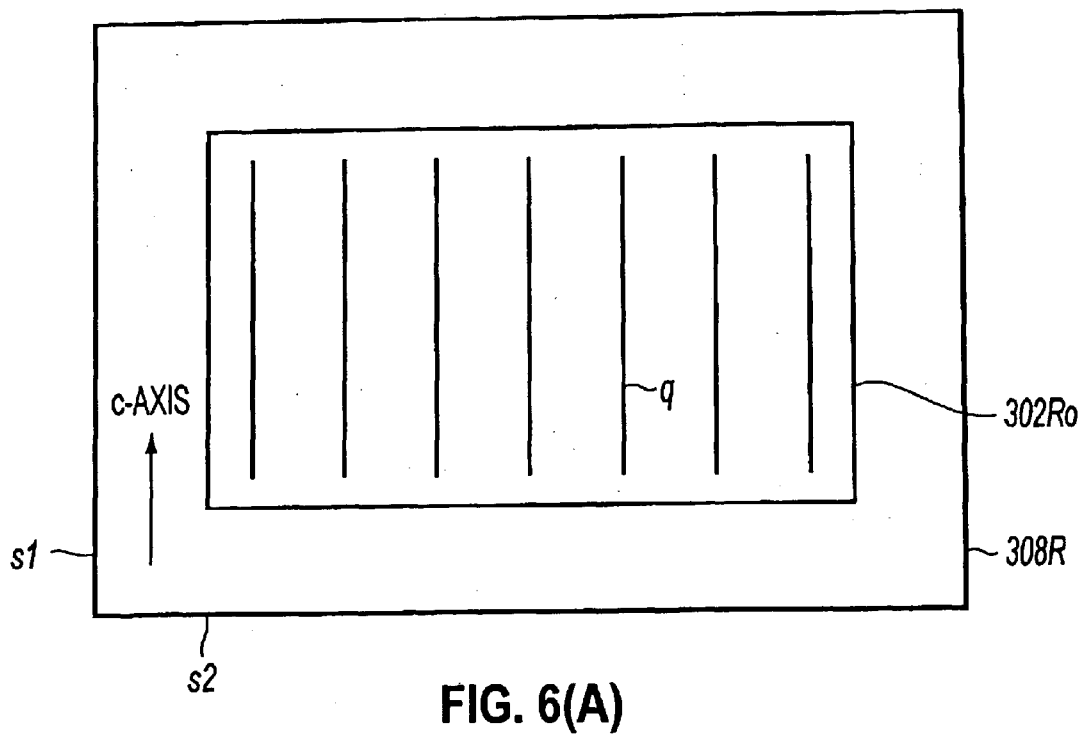
FIG. 6 illustrates the relationship between a c-axis of a single-crystal sapphire substrate and a polarization axis of a polarizer.
Figure 6B:
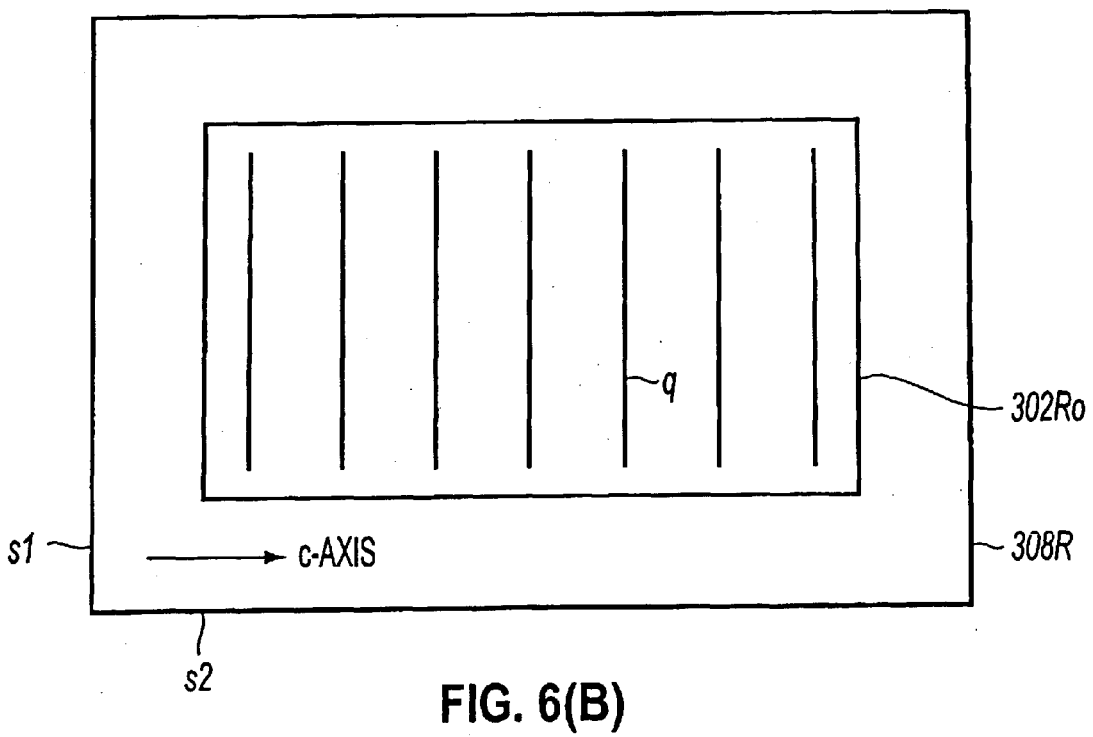

FIG. 6 illustrates the relationship between the c-axis of a single-crystal sapphire substrate and the polarization axis of a polarizer. In a single-crystal sapphire substrate 308R shown in FIG. 6(A), a reference side is set to be a first side s1 which extends vertically in the figure, and the c-axis is inclined about 3° to about 7° with respect to the reference side s1. A polarizer 302Ro is provided on the substrate 308R so that the polarization axis p thereof is substantially parallel to the reference side s1 of the single-crystal sapphire substrate 308R. In this case, the c-axis of the substrate 308R is substantially parallel to the polarization axis p of the polarizer 302Ro. On the other hand, in a single-crystal sapphire substrate 308R shown in FIG. 6(B), a reference side is set to be the second side s2 which extends horizontally in the figure, and the c-axis is inclined about 3° to about 7° with respect to the reference side s2. A polarizer 302Ro is provided on the substrate 308R so that the polarization axis p thereof is substantially perpendicular to the reference side s2 of the single-crystal sapphire substrate 308R. In this case, the c-axis of the substrate 308R is substantially perpendicular to the polarization axis p of the polarizer 302Ro.

As shown in FIGS. 6(A) and 6(B), the polarizer 302Ro may be provided on the single-crystal sapphire substrate so that the polarization axis p thereof is substantially parallel to or perpendicular to one reference side selected from perpendicularly intersecting two sides of the single-crystal sapphire substrate 308R. In other words, the c-axis of the substrate 308R may be substantially parallel to or perpendicular to the polarization axis p of the polarizer 302Ro.

The c-axis of the substrate 308R is set to be substantially parallel to or perpendicular to the polarization axis p of the polarizer 302Ro in order not to change the polarization state of light passing through the single-crystal sapphire substrate 308R. That is, the single-crystal sapphire is, as shown in FIG. 4, a uniaxial crystal, and a refractive index in the c-axis direction differs from a refractive index in the direction perpendicular to the c-axis. For this reason, when light enters in the direction substantially perpendicular to the c-axis as in this embodiment, the polarization state is changed according to an angle formed between a plane of vibration of light and the c-axis of the crystal. In this embodiment, in order to reduce the change of the polarization state due to the passage through the single-crystal sapphire substrate as much as possible, the relationship between the c-axis of the substrate 308R and the polarization axis p of the polarizer 302Ro is set to be substantially parallel to or perpendicular to each other.

Figure 7:
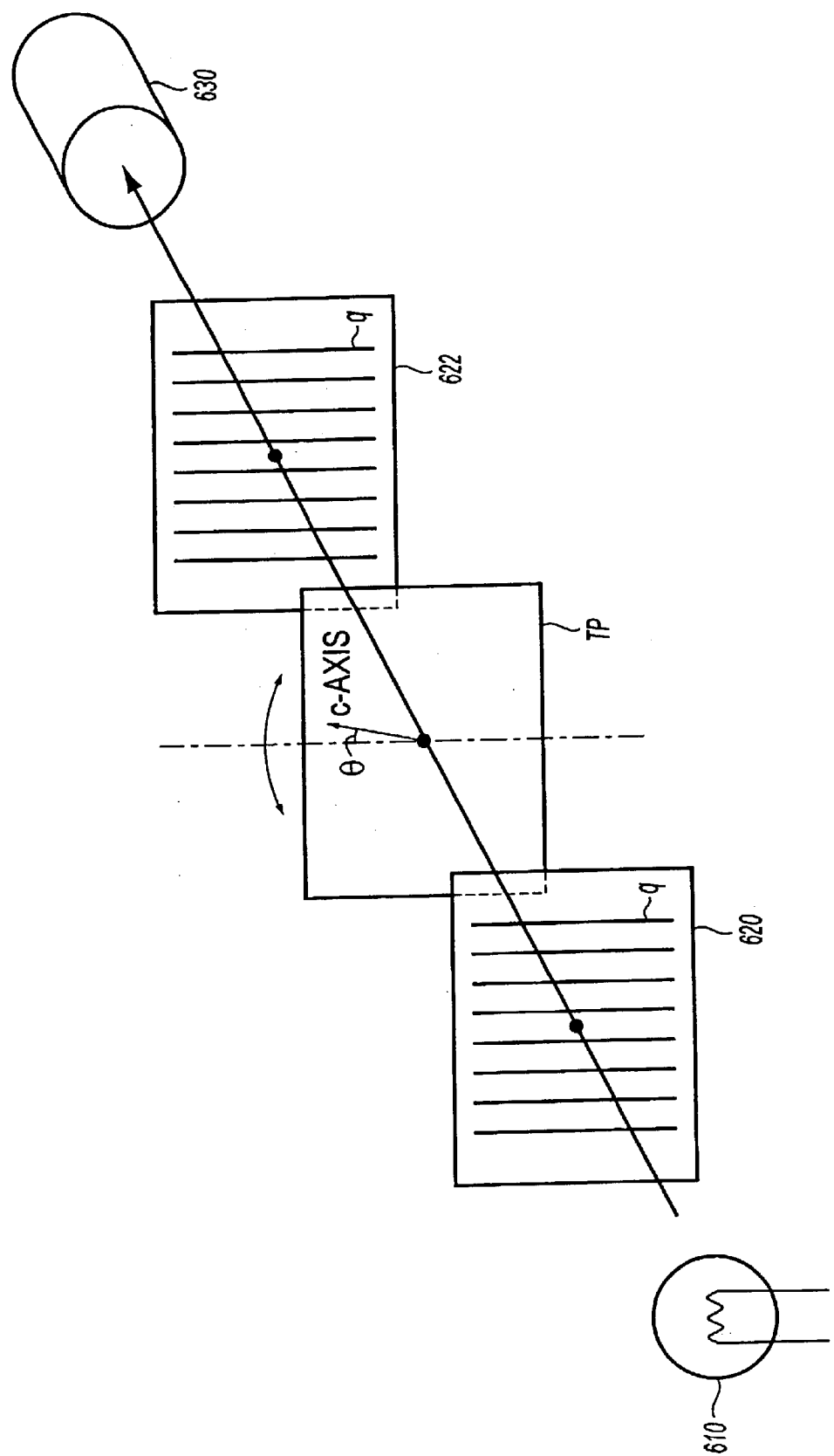
FIG. 7 illustrates an experimental system for measuring angle dependency of the c-axis of the single-crystal sapphire substrate.

FIG. 7 is an illustration showing an experimental system for measuring angle dependency of the c-axis of the single-crystal sapphire substrate. The experimental system includes a light source 610, a first polarizer 620, a second polarizer 622, and a light intensity-measuring device 630 for measuring the intensity of incident light. Polarization axes p of the first and second polarizers 620 and 622 are set to be parallel to each other. A single-crystal sapphire substrate TP to be tested is placed between the first polarizer 620 and the second polarizer 622. The single-crystal sapphire substrate TP is rotatably provided about a direction of travel of light, and an angle φ which the c-axis of the crystal with the polarization axes p of the first and second polarizers 620 and 622 can be changed.

Light emitted from the light source 610 passes through the first polarizer 620, whereby it is turned into a linear polarized light beam. A linear polarized light beam emitted from the first polarizer 620 passes through the single-crystal sapphire substrate TP to enter the second polarizer 622. The second polarizer 622 transmits only a polarized light component that is the same as the linear polarized light beam emitted from the first polarizer 620. Light emitted from the second polarizer 622 is measured by the light intensity-measuring device 630.

Figure 8:
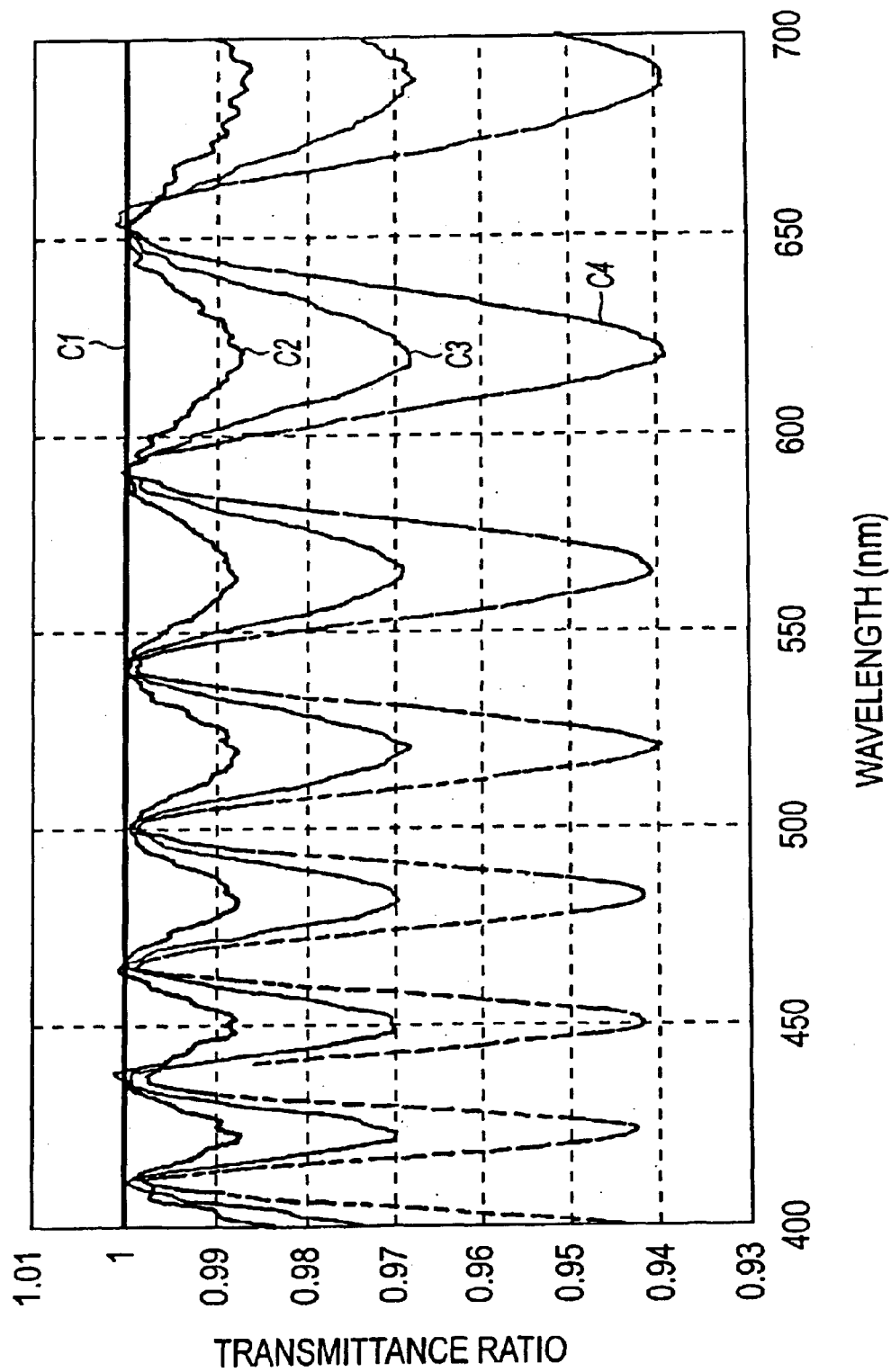
FIG. 8 is a graph showing transmittance characteristics of the single-crystal sapphire substrate obtained by the experimental system in FIG. 7.

FIG. 8 is a graph showing transmittance characteristics of the single-crystal sapphire substrate TP obtained by the experimental system in FIG. 7. The horizontal axis of the graph represents the wavelength (nm) and the vertical axis represents the transmittance ratio. The transmittance ratio is based on the transmittance that is measured when the angle φ in FIG. 7 is about 0°. Since the curve C1 shows the transmittance ratio when the angle φ is about 0°, the value of the transmittance ratio is always 1. The curves C2 to C4 show the transmittance ratios when the angle φ is about 3°, 5°, and 7°, respectively. When the angle φ shifts about 3°, 5°, and 7° in the direction opposite to the direction shown in FIG. 7, almost the same results as the curves C2 to C4 are obtained.

As will be understood from the graph in FIG. 8, when the angle φ is about 3° (curve C2), a wavelength band can be found in which the transmittance ratio becomes smaller about 1% at the maximum, as compared to a case where the angle φ is about 0° (curve C1). When the angle φ is about 5° (curve C3), a wavelength band can be found in which the transmittance ratio becomes smaller about 3% at the maximum, as compared to a case where the angle φ is about 0°.

Similarly, when the angle φ is about 7° (curve C4), a wavelength band can be found in which the transmittance ratio becomes smaller about 6% at the maximum, as compared to a case where the angle φ is about 0°. The transmittance ratio becomes smaller according to the angle φ in this way because the polarization state of light (linear polarized light beam) emitted from the first polarizer 620 in FIG. 7 is changed by passing through the single-crystal sapphire substrate TP.

The angle φ which the c-axis of the single-crystal sapphire substrate TP forms with the polarization axis p of the polarizer in FIG. 7 is equivalent to the angle θ which the c-axis of the single-crystal sapphire substrate 308R forms with the reference side s1 in FIG. 3. That is, by conducting the above experiment, the transmittance of the linear polarized light beam according to the angle θ can be known. In addition, the above experimental results proves that, when the single-crystal sapphire substrate 308R is used having an inclination angle θ set to be about 3° to about 7° with respect to the reference side s1, as shown in FIG. 3, the transmittance is almost the same as that obtained when a conventional single-crystal sapphire substrate is having an inclination angle θ set within about 1°.

From the foregoing, when the single-crystal sapphire substrate 308R in which the inclination angle θ of the c-axis falls within the range of about 3° to about 7° as in this embodiment is applied to a projector, it is possible to easily manufacture the projector without deteriorating too much the optical characteristics of the projector.

While the single-crystal sapphire substrate 308R in which the inclination angle θ of the c-axis is about 3° to 7° is used in this embodiment, the inclination angle θ of the c-axis may preferably be as small as possible. For example, if a single-crystal sapphire substrate is used in which the inclination angle θ of the c-axis is about 3° to 5°, it is possible to further inhibit the deterioration of the optical characteristics of the projector.

In this embodiment, as shown in FIG. 2, the polarizer 302Ro provided on the single-crystal sapphire substrate 308R is disposed on the side of the light emission surface of the liquid crystal panel 301R so that light emitted from the polarizer 302Ro enters the single-crystal sapphire substrate 308R. If the single-crystal sapphire substrate 308R and the polarizer 302Ro are disposed so that light enters in this order, light whose polarization state is changed by passing through the single-crystal sapphire substrate 308R will enter the polarizer 302Ro. In this case, since a part of light that should be transmitted is intercepted by the polarizer 302Ro, contrast of an image light (modulated light) emitted from the liquid crystal light valve 300R is lowered. That is, the disposition as shown in FIG. 2 offers the advantage of not lowering contrast of the image light emitted from the liquid crystal light valve 300R, even if the polarization state of light is changed by the single-crystal sapphire substrate 308R.

As described above, according to the projector of this embodiment, the liquid crystal light valves 300R, 300G, and 300B include the single-crystal sapphire substrates each having a substantially rectangular shape provided on the side of the light emission surfaces, and the polarizers provided on the substrates. The single-crystal sapphire substrate includes the c-axis that is substantially parallel to the surface of the substrate. In addition, the c-axis of the single-sapphire substrate has an inclination of about 3° to about 7° with respect to one reference side selected from the perpendicularly intersecting two sides of the nearly rectangular shape. The application of the single-crystal sapphire substrate having such a c-axis to a projector makes it possible to easily manufacture the projector without deteriorating too much the optical characteristics of the projector.

As will be understood from the foregoing description, the first to third liquid crystal light valves 300R, 300G, and 300B of this embodiment correspond to the first to third electro-optical devices in the present invention, respectively. In general, the word "electro-optical device" sometimes means an electro-optical device in a narrow sense, indicating only a liquid crystal panel, whereas it means an electro-optical device in a wider sense including liquid crystal panels and polarizers in this specification.

Figure 9:
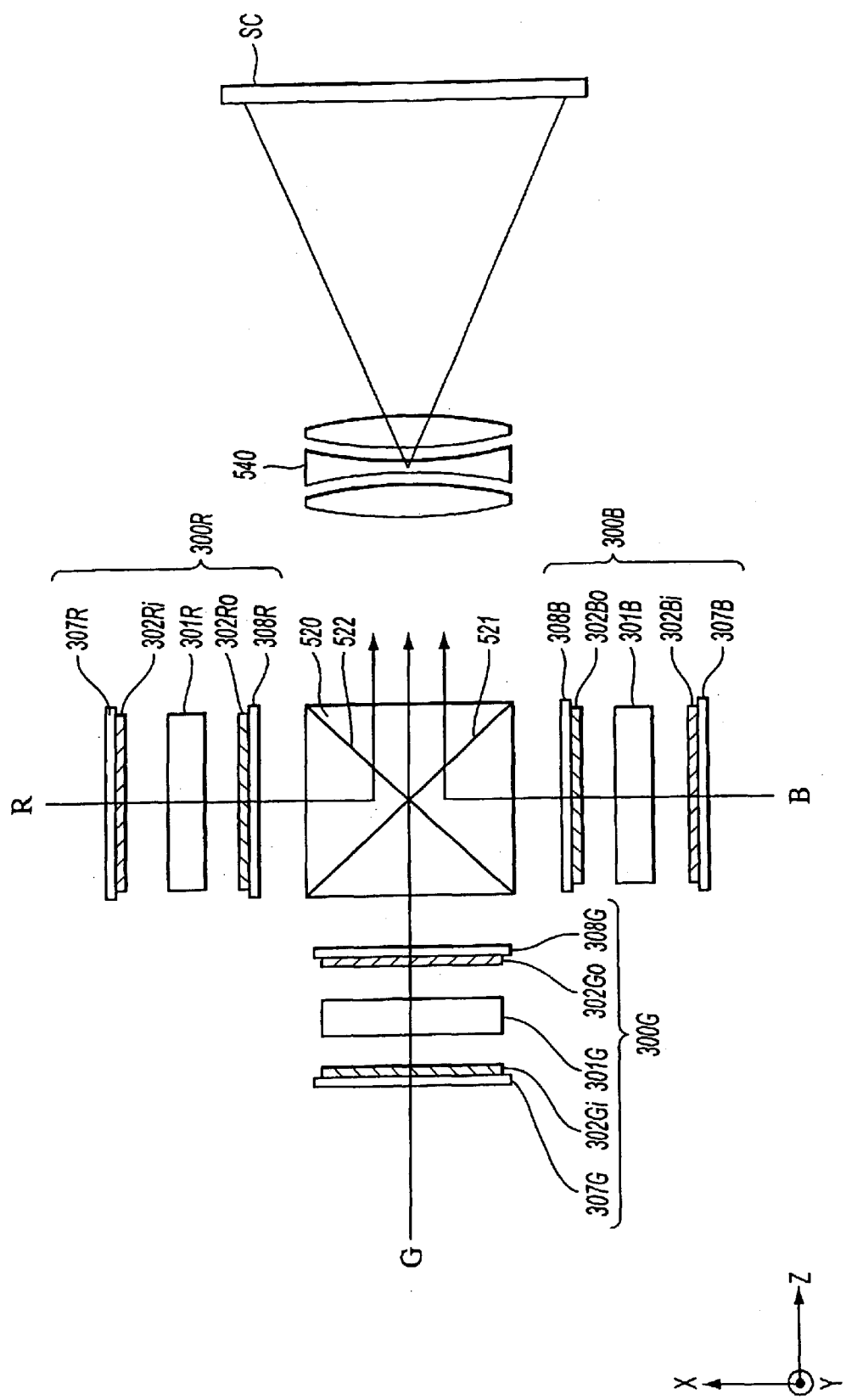
FIG. 9 illustrates a principal part of a second embodiment of a projector to which the present invention is applied.
Figure 10:
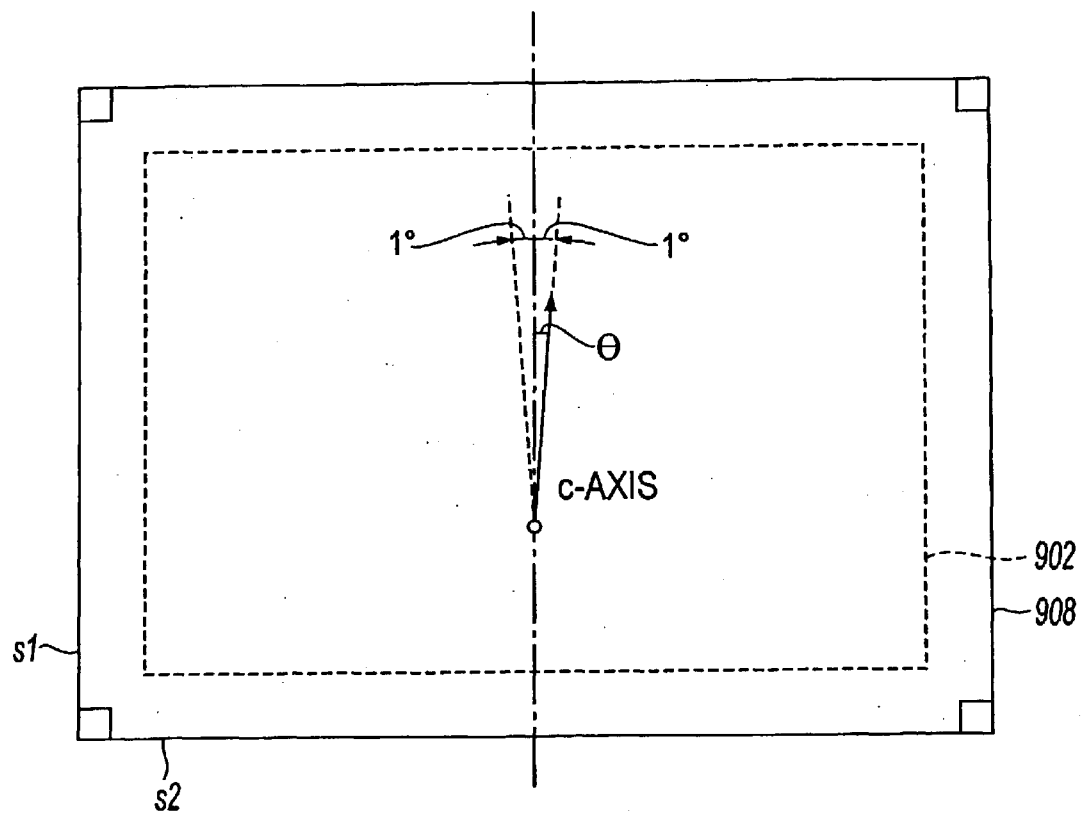
FIG. 10 illustrates a conventional single-crystal sapphire substrate 908.

B. Second Embodiment:

FIG. 9 illustrates a principal part of a second embodiment of a projector to which the present invention is applied. In the first embodiment, as shown in FIG. 2, only the second polarizers 302Ro, 302Go, and 302Bo provided on the side of the light emission surfaces of the liquid crystal light valves 300R, 300G, and 300B are bonded to the single-crystal sapphire substrates 308R, 308G and 308B.

On the other hand, in this embodiment, first polarizers 302Ri, 302Gi, and 302Bi provided on the side of the light incidence surfaces of the liquid crystal light valves 300R, 300G, and 300B are also bonded to single-crystal sapphire substrates 307R, 307G and 307B. The single-crystal sapphire substrates 307R, 307G and 307B to which the first polarizers 302Ri, 302Gi, and 302Bi are bonded are the same as the single-crystal sapphire substrates 308R, 308G and 308B.

As shown in FIG. 9, according to this embodiment, the polarizer 302Ri provided on the single-crystal sapphire substrate 307R is disposed on the side of the light incidence surface of the liquid crystal panel 301R so that light emitted from the single-crystal sapphire substrate 307R enters the polarizer 302Ri. If the polarizer 302Ri and the single-crystal sapphire substrate 307R are disposed so that light enters in this order, the polarization state of a linear polarized light beam emitted from the polarizer 302Ri is changed by passing through the single-crystal sapphire substrate 307R, and light that is not a linear polarized light beam enters the liquid crystal panel 301R. If such light enters the liquid crystal panel 301R, contrast of an image light emitted from the liquid crystal light valve 300R is lowered. That is, by the disposition as shown in FIG. 9, even if the polarization state of light is changed by the single-crystal sapphire substrate 307R, the light passes through the polarizer 302Ri thereafter, so that a linear polarized light beam can enter the liquid crystal panel 301R. This avoids lowering of contrast of the image light emitted from the liquid crystal light valve 300R.

As described above, according to the projector of this embodiment, the liquid crystal light valves 300R, 300G, and 300B include the single-crystal sapphire substrates each having nearly a rectangular shape, and the polarizers on the side of the light incidence surfaces and on the side of the light emission surfaces. Since the single-crystal sapphire substrates are the same as the single-crystal sapphire substrates of the first embodiment, it is also possible in this embodiment to easily manufacture the projector without deteriorating too much the optical characteristics of the projector.

This invention is not limited to the above embodiments and modes for carrying out the invention, and can be carried out in various forms without departing from the spirit and scope of the invention. For example, the following modifications can be made.

(1) In the first embodiment, as shown in FIG. 2, while the liquid crystal light valves 300R, 300G, and 300B include the polarizers on both sides of the light incidence surfaces and the light emission surfaces, only the second polarizers on the side of the light emission surfaces are provided on the single-crystal sapphire substrates 308R, 308G and 308B. On the other hand, in the second embodiment, as shown in FIG. 9, the liquid crystal light valves 300R, 300G, and 300B include the polarizers on both sides of the light incidence surfaces and the light emission surfaces, and both polarizers are provided on the single-crystal sapphire substrates 307R, 307G and 307B and 308R, 308G and 308B.

In addition, in the first and second embodiments, since the projector 1000 includes the illuminating optical system 100 for emitting a linear polarized light beam, the first polarizers 302Ri, 302Gi, and 302Bi provided on the side of the light incidence surfaces of the liquid crystal light valves 300R, 300G, and 300B may be omitted.

In this way, electro-optical devices of the present invention may include the single-crystal sapphire substrates each having a substantially rectangular shape, and the polarizers provided on the single-crystal sapphire substrates on at least one side of the light incidence surfaces and the light emission surfaces.

(2) While the projector 1000 (FIG. 1) includes the illuminating optical system 100 for emitting a linear polarized light beam in the above embodiments, an illuminating optical system for emitting unpolarized light may be included instead. In this case, however, since the first polarizers 302Ri, 302Gi, and 302Bi provided on the side of the light incidence surfaces produce a large amount of heat, the first polarizers may preferably be provided on the single-sapphire substrates as in the second embodiment (FIG. 9).

(3) While the temperature rise of the polarizers is reduced by bonding the polarizers to the single-crystal sapphire substrates in the above embodiments, a cooling device for forcibly cooling the polarizer may additionally be used. For example, the polarizers bonded to the single-crystal sapphire substrates may be cooled with a cooling fan. In addition, the polarizers may be cooled by placing the single-crystal sapphire substrates having the polarizers bonded thereto in a liquid, and by circulating the liquid between the single-crystal sapphire substrates and a heat changer. Alternatively, the polarizers may be cooled by bringing a Peltier element into contact with corners of the polarizers or the single-crystal sapphire substrates. The use of such a cooling device makes it possible to fairly reduce the temperature rise of the polarizers. When the polarizers are forcibly cooled as described above, not only the polarizers, but also the overall liquid crystal light valves, may be cooled.

(4) While an example has been described in the above embodiments in a case where the present invention is applied to a transmissive projector, it is possible to apply the present invention to a reflective projector.

Here, "transmissive" means that an electro-optical device serving as an optical modulation means, such as a transmissive liquid crystal panel, is of a type for transmitting light, and "reflective" means that an electro-optical device serving as an optical modulation means, such as a reflective liquid crystal panel, is of a type for reflecting light. When this invention is applied to the reflective projector, advantages that are substantially similar to those of the transmissive projector can be obtained.

(5) While the projector 1000 for displaying a color image is described in the above embodiments, the description also applies to a projector for displaying a monochrome image.

(6) As will be understood from the graph in FIG. 8, the single-crystal sapphire substrate has the characteristics of decreasing transmittance of a linear polarized light beam according to the wavelength. According to the graph in FIG. 8, for example, the transmittance of the linear polarized light beam having a wavelength of about 450 nm is decreased.

If the characteristics are utilized, there is a possibility that the wavelength of the emitted linear polarized light beam can be suitably selected by entering light emitted from the single-crystal sapphire substrate into the polarizer. For example, of light emitted from the illuminating optical system, if intensity of light having a predetermined wavelength is remarkably high, it is possible to decrease the intensity of light of the wavelength.

What is claimed is:

1. A projector comprising:

an illuminating optical system that emits illumination light;

an electro-optical device that modulates light from the illuminating optical system according to image information, the electro-optical device including on at least one side of a light incidence surface and a light emission surface a single-crystal sapphire substrate having a substantially rectangular shape;

a projection optical system that projects a modulated light beam flux obtained by the electro-optical device; and a polarizer provided on the single-crystal sapphire substrate, the single-crystal sapphire substrate and the polarizer are located to select a wavelength of a linear polarized light emitted from the polarizer.

2. A projector as claimed in claim 1, wherein the single-crystal sapphire substrate and the polarizer are located to decrease intensity of light having a predetermined wavelength that is remarkably higher than another wavelength of the light emitted from the illuminating optical system.

3. A projector as claimed in claim 1, wherein the single-crystal sapphire substrate includes a c-axis substantially parallel to the surface of the substrate; and the c-axis has an inclination of greater than 2° to about 7° with respect to one reference side selected from perpendicularly intersecting two sides of the nearly rectangular shape.

4. A projector as claimed in claim 1, wherein the polarizer is provided on the single-crystal sapphire substrate so that the polarization axis of the polarizer is substantially parallel to one reference side selected from perpendicularly intersecting two sides of the nearly rectangular shape.

5. A projector as claimed in claim 1, wherein the polarizer is provided on the single-crystal sapphire substrate so that the polarization axis of the polarizer is substantially perpendicular to one reference side selected from perpendicularly intersecting two sides of the nearly rectangular shape.

6. A projector as claimed in claim 1, wherein the polarizer formed on the single-crystal sapphire substrate is provided on the side of the light emission surface of the electro-optical device, and the single-crystal sapphire substrate and the polarizer are disposed so that light emitted from the polarizer enters the single-crystal sapphire substrate.

7. A projector as claimed in claim 1, wherein the polarizer formed on the single-crystal sapphire substrate is provided on the side of the light incidence surface of the electro-optical device, and the single-crystal sapphire substrate and the polarizer are disposed so that light emitted from the single-crystal sapphire substrate enters the polarizer.

8. A projector that projects and displays a color image, comprising:

an illuminating optical system that emits illumination light;

a color light separation optical system that separates the illumination light emitted from the illuminating optical system into first to third color lights having three color components;

first to third electro-optical devices that modulate the first to third color lights separated by the color light separation optical system according to image information to produce first to third modulated light beam fluxes, each of the first to third electro-optical devices including on at least one side of a light incidence surface and a light emission surface a single-crystal sapphire substrate having a substantially rectangular shape;

a color synthesizing section that synthesizes the first to third modulated light beam fluxes;

a projection optical system that projects synthesized light emitted from the color synthesizing section; and a polarizer provided on the single-crystal sapphire substrate;

the single-crystal sapphire substrate and the polarizer are located to select a wavelength of a linear polarized light emitted from the polarizer.

9. A projector as claimed in claim 8, wherein the single-crystal sapphire substrate and the polarizer are located to decrease intensity of light having a predetermined wavelength that is remarkably higher than another wavelength of the light emitted from the illuminating optical system.

10. A projector as claimed in claim 8, wherein the single-crystal sapphire substrate includes a c-axis substantially parallel to the surface of the substrate; and the c-axis has an inclination of greater than 2° to about 7° with respect to one reference side selected form perpendicularly intersecting two sides of the nearly rectangular shape.

* * * * *